United States Patent [19]

Skelly et al.

[11] 4,098,948

[45] Jul. 4, 1978

[54] CHEMICAL COMPOSITION

[75] Inventors: James Kenneth Skelly, Wilmslow; James Harry Astbury, Stockport, both of England

[73] Assignee: Ciba-Geigy Corporation, Ardsley, N.Y.

[21] Appl. No.: 746,906

[22] Filed: Dec. 2, 1976

Related U.S. Application Data

[63] Continuation of Ser. No. 571,028, Apr. 23, 1975, abandoned.

[30] Foreign Application Priority Data

Jan. 23, 1975 [GB] United Kingdom ................ 2928/75

[51] Int. Cl.² .............................................. B32B 9/06
[52] U.S. Cl. .................................. 428/411; 162/135; 427/145; 427/150; 427/152; 427/258; 427/261; 427/337; 427/399; 428/280; 428/284; 428/289; 428/511; 428/537
[58] Field of Search ............... 427/145, 150, 151, 152, 427/260, 283, 301, 337, 399; 428/537, 280, 284, 289, 318, 511, 411; 162/135

[56] References Cited

U.S. PATENT DOCUMENTS 3,823,022   7/1974   Thomas ................................ 427/151

*Primary Examiner*—James J. Bell
*Attorney, Agent, or Firm*—Edward McC. Roberts; Prabodh I. Almaula

[57] ABSTRACT

An image producing system is provided which comprises paper impregnated or coated with a dispersion of a color former in a mixture of water and a water-miscible organic solvent for the color former; and a carrier material impregnated with a solution of an organic acid in a weakly volatile high boiling solvent.

11 Claims, No Drawings

CHEMICAL COMPOSITION

This is a continuation of application Ser. No. 571,028, filed on Apr. 23, 1975 now abandoned.

The present invention relates to a composition for treating paper, which contains a colour former.

Our copending Application No. 18199/74 describes and claims an ink which comprises a neutral or substantially neutral aqueous or non-aqueous vehicle, a liquid organic base and a colour former. The ink is used for printing on to selected areas of a substrate and when contacted with an acid, the printing changes colour because of the activation of the colour former.

It is an object of the present invention to provide a composition for incorporating into the mass of paper, or for completely or partially coating paper.

Accordingly, the present invention provides a composition comprising a dispersion of a colour former in a mixture of water and a water-miscible organic solvent for the colour former.

The present invention also provides a process for preparing the composition which comprises dissolving a colour former in a water-miscible organic solvent and stirring the resulting solution into water.

The organic solvent should be one which will dissolve the selected colour former and be miscible with water. Suitable solvents include ketones, e.g. acetone; alkoxyethanols, e.g. methoxy ethanol and ethoxyethanol; dimethyl formamide and dimethyl sulphoxide. However, it is preferably non-flammable or has a relatively high flash point and preferably non-toxic. It is also preferred to use a fairly low boiling solvent, for example on having a boiling point below 150° C.

The colour former may be any colourless or coloured colour former. These are known compounds which, when contacted by an acid produce a colour, in the case of the normally colourless compounds, or change to a different colour, in the case of the coloured ones.

Any colour former may be used. The colour former may be a lactone type, spyropyran or related compound, a leuco type or metal complex forming type, but is preferably an azo compound having the general formula I

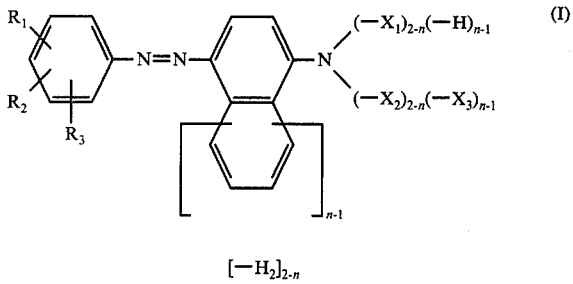

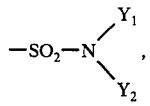

in which $R_1$, $R_2$ and $R_3$ each represents hydrogen, halogen, alkyl, alkoxy, aryloxy, alkoxycarbonyl, dialkylaminocarbonyl, acylamino, acyl(alkyl)amino, $$-SO_2-N\begin{matrix}Y_1\\ Y_2\end{matrix},$$

in which $Y_1$ and $Y_2$ each represents alkyl or aryl, or in which $Y_1$ and $Y_2$ together represent an alkylene group; $X_1$ is hydrogen or an alkyl group, $X_2$ is an alkyl, cyanoalkyl or arylmethylene group or $X_1$ and $X_2$ together represent an alkylene group, $X_3$ is an alkyl or aryl group and $n$ is 1 or 2, preferably 1, or the general formula II:

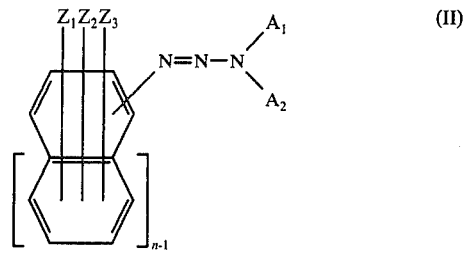

in which $Z_1$, $Z_2$ and $Z_3$ each represents hydrogen, alkyl, substituted alkyl, alkoxy, halogen, nitro, acylamino, aminoacyl or alkoxycarbonyl, $A_1$ and $A_2$ each represents alkyl or phenyl or $A_1$ and $A_2$ together with the nitrogen atom to which they are bound form a heterocyclic ring system and $n$ is 1 or 2.

The amount of colour former in the dispersion varies according to the particular colour former used and on the desired effect, i.e. whether a dark colour is required or not. In general, the amount used may be from 0.01% to 2%, preferably 0.01% to 1% and more preferably 0.1% to 0.5% by weight, e.g. 0.2%.

The present invention also provides a process for treating paper which comprises treating paper pulp in a beater or coating paper with a colour former dispersion as defined above, and the paper so treated.

The paper can be coated by any suitable means, such as a size press, roller coating, air-knife coating, blade coating, brush coating or printing.

When the dispersion is used for treating paper pulp in a beater it is advantageous to add the solution of colour former in organic solvent directly into the beater which already contains a considerable amount of water thereby forming the dispersion in situ.

The paper used must be either neutral or alkaline sized to prevent the colour former from reacting prematurely with the paper. The pH of the paper used should be not below 6.5 and this can be achieved, for example, by sizing with aluminium sulphate, rosin size and sodium aluminate to produce a neutral size, or with a ketene dimer to produce an alkaline sized paper.

In some cases it is found that the dispersion is not sufficiently stable to carry out, for example, a long run by a coating technique as previously described. In these cases it is advantageous to add a polymer latex to the dispersion, acrylic latices being particularly suitable. This may be added in amounts of from 0.1 to 5%, preferably from 0.5 to 2%. In addition, the disperison may also contain a starch in a concentration of from 1 to 10%, preferably about 5%.

As an additional feature, the dispersion may also contain a dyestuff or pigment. This will colour the paper with its own colour if a colourless colour former is used or a different colour if a coloured, particularly a yellow, colour former is used. This enables different colours to be produced when the treated paper is contacted with a colour former activating substance.

Suitable activating substances are organic acids, such as maleic acid, exalic acid, malonic acid, succinic acid, glutaric acid, adipic acid, tricarballylic acid, diglycollic acid, lactic acid, malic acid, tartaric acid, citric acid, pyrephosphonic acid, benzene sulphonic acid, naphthalene-2-sulphonic acid, 1-phenol-4-sulphonic acid, polymaleic acid, co- and ter-polymers of maleic acid with ethyl acrylate and vinyl acetate, hydroxyethane diphosphonic acid and methylamino-N-N-di-methylene phosphonic acid.

When the colour former is a triazene compound of formula II it also needs to be contacted with an azo coupling component which may be in admixture with the activating substance.

The present invention also provides an image producing system which comprises a paper substrate impregnated or coated with a dispersion as defined above, and a carrier material impregnated with a solution of an organic acid in a weakly volatile high boiling solvent.

The invention also provides a method of producing an image which comprises impregnating or coating a paper substrate with a dispersion as defined above, impregnating a carrier material with a solution of an organic acid in a weakly volatile high boiling solvent and transforming the organic acid on to said impregnated or coated substrate.

The carrier material which is impregnated with the organic acid may be a fabric, such as is used for example in typewriter ribbons, a paper material, possibly in ribbon form, such as crepe paper, wet laid or dry laid paper, or a felt or fabric pad such as are used with a rubber stamp or in a felt tipped pen.

It is preferred to absorb the organic acid on to a fabric ribbon to produce a typewriter ribbon, or on to a felt or fabric pad. The organic acid is then transferred on to the substrate by typing with the ribbon, or by means of a rubber stamp from the pad. The carrier material may be impregnated with from 5 – 200% of its dry weight of the organic acid solution, preferably from 5 – 100%.

The solvent used to dissolve the organic acid may be any weakly volatile high boiling solvent having a boiling point of at least 150°, preferably at least 300° C. Suitable solvents include, for example, partially hydrogenated terphenyl, liquid paraffin, tricresyl phosphate, di-n-butyl phthalate, dioctyl phthalate, trichlorobenzene, glycerol nitrobenzene, trichloroethyl phosphate or waterinsoluble hydrocarbon oils, alkyl phthaloyl butyl glycollates, such as propyl-, pentyl-, hexyl- or preferably butylphthaloyl butyl glycollate; ethylene glycol, diethylene glycol, triethylene glycol or polyethylene glycols having a molecular weight of from 200 to 600, e.g. 400, or mixtures thereof.

The amount of organic acid in the solvent is preferably such as to give a saturate solution. Lower amounts may be used, but are less satisfactory. The resulting organic acid solution must have some water present, but the amount can be very small, even minute amounts being sufficient.

When the dispersion is used to impregnate the paper in a beater, the dyestuff used may be a water soluble substantive dyestuff or a dispersion of a water insoluble dye or pigment. When the dispersion is used to coat paper by one of the techniques described, the dyestuff may be any water-soluble dye or a dispersion of a water insoluble dye or pigment. The dyestuff may be of any desired colour, providing, of course, that it does not mask the colour produced when the colour former is activated.

Various colour changes are possible by using different dyes and colour formers. Some of the numerous possible colour changes are as follows:

YELLOW → BLUE

This can be achieved by the use of a yellow colour former, which changes colour to blue when activated, either alone or with a yellow dyestuff. Alternatively, a colourless colour-former which turns blue when activated can be used with a yellow dyestuff.

YELLOW → RED

As for yellow → blue, except that colour formers which turn red when activated are used.

COLOURLESS → BLUE

A colourless colour former which turns blue when activated.

COLOURLESS → RED

A colourless colour former which turns red when activated.

BLUE → RED

Blue dye plus a colourless colour former which turns red when activated.

RED → BLUE

Red dye plus a yellow or colourless colour former which turn blue when activated.

GREEN → BLUE

Green dye plus a yellow or colourless colour former which turn blue when activated.

GREEN → RED

Green dye plus a yellow or colourless colour former which turn red when activated or a blue dye plus a yellow colour former which turns red when activated.

YELLOW → GREEN

Yellow dye plus a colourless colour former which turns green when activated.

BLUE → GREEN

Blue dye plus a colourless colour former which turns green when activated.

RED → GREEN

Red dye plus a colourless colour former which turns green when activated.

COLOUR OR COLOURLESS → BLACK

Dye plus a mixture of colour formers which when activated produce colours which, with the dye form black It should be noted that where a dyestuff is present, the final colour is an additive effect of the dyestuff colour and the colour produced by the activated colour former.

When the colour formers are azo compounds of the formula I, they are preferably those of the general formula III:

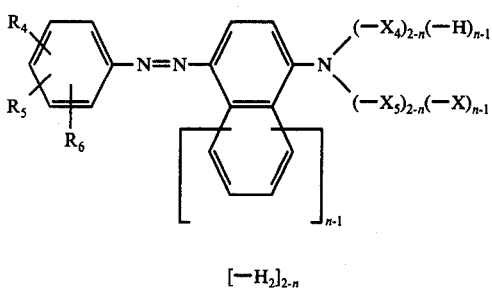

$$[-H_2]_{2-n}$$

in which $R_4$, $R_5$ and $R_6$ each represent lower alkyl, lower alkoxy, halogenphenoxy, phenoxy, lower alkoxycarbonyl, lower dialkylaminocarbonyl, acetylamino, halogen, acetyl(lower alkyl)amino,

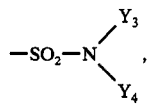

in which $Y_3$ and $Y_4$ each represents lower alkyl or phenyl, or in which $Y_3$ and $Y_4$ together represent an alkylene group with 4 or 5 carbon atoms and, at most two of the radicals $R_4$, $R_5$ and $R_6$ being hydrogen, $X_4$ is hydrogen or lower alkyl, $X_5$ is lower alkyl, lower cyanoalkyl or benzyl, or $X_4$ and $X_5$ together represent an alkylene group with 4 or 5 carbon atoms, $X_6$ is lower alkyl or phenyl and $n$ is 1 or 2.

Of special interest are azo compounds of the formula IV:

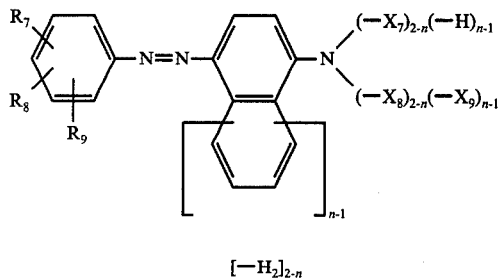

$$[-H_2]_{2-n}$$

in which $R_7$, $R_8$ and $R_9$ each represents methyl, methoxy, phenoxy, dichlorophenoxy, methoxycarbonyl, dimethylaminocarbonyl, acetylamino, chlorine, acetyl(-methyl)amino,

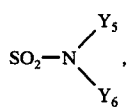

in which $Y_5$ and $Y_6$ each represent methyl, ethyl or phenyl or in which $Y_5$ and $Y_6$ together represent a pentylene group, at most two of the radicals, $R_7$, $R_8$ and $R_9$ being hydrogen, $X_7$ is methyl or ethyl, $X_8$ is methyl, 2-cyanoethyl or benzyl, $X_9$ is methyl or ethyl and $n$ is 1 or 2.

Advantageous results are obtained with colour formers of the formula V:

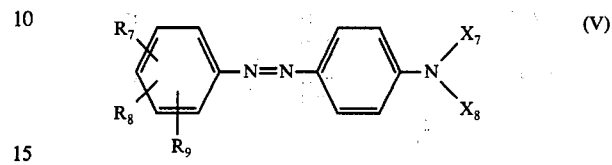

in which $R_7$, $R_8$, $R_9$, $X_7$ and $X_8$ have the meanings given above, and very suitable are colour formers of the formula VI:

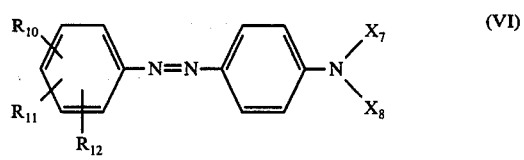

in which $R_{10}$, $R_{11}$ and $R_{12}$ each represents methoxy, methoxycarbonyl chlorine, diethylaminosulfonyl or acetylamino, at most two of the radicals $R_{10}$, $R_{11}$ and $R_{12}$ being hydrogen and $X_7$ and $X_8$ have the meanings given above.

The terms lower alkyl or lower alkoxy in the definitions of radicals of the colour formers means radicals with 1 to 5, especially 1 to 3 carbon atoms, such as methyl, ethyl, propyl, benzyl or amyl.

When one or more of the R-radicals contain acyl groups, the acyl radical may be derived, for example, from an aliphatic monocarboxylic acid having 1 to 4 carbon atoms such as acetic acid.

When one or more of the R-radicals is halogen it is, e.g. iodine, bromine but preferably chlorine.

When $Y_1$ and $Y_2$ or $Y_3$ and $Y_4$ together represent an alkylene group they form together with the nitrogen atom a heterocyclic ring such as piperidine or pyrrolidine.

Aryl radicals in any of the definitions of the colour formers especially means naphthalene, diphenyl and preferably benzene radicals.

These colour formers may be prepared by conventional methods known in the art, e.g. by diazotizing a substituted aniline and coupling it onto a N-substituted aniline.

Specific Examples of compounds of general formula I which may be used in the present invention are given in Table I, in which $n$ in formula I is 1 and in Table II in which $n$ in formula I is 2.

Table I

| No. | Substituents in formula I | | | | | Absorption maximum λmax. in nm | | Colour of protonated dye* |
|---|---|---|---|---|---|---|---|---|
| | $R_1$ | $R_2$ | $R_3$ | $X_1$ | $X_2$ | free base | protonated | |
| 1 | —H | —H | 4-CH$_3$CONH | —CH$_3$ | —CH$_3$ | 411 | 550 | violet |
| 2 | 2-CH$_3$ | —H | —H | —CH$_3$ | —CH$_3$ | 401 | 506 | orange |
| 3 | —H | 3-CH$_3$ | —H | —CH$_3$ | —CH$_3$ | 406 | 520 | red |
| 4 | —H | —H | 4-CH$_3$ | —CH$_3$ | —CH$_3$ | 404 | 528/542 | red |
| 5 | 2-OCH$_3$ | —H | —H | —CH$_3$ | —CH$_3$ | 413 | 540 | violet |
| 6 | —H | —H | 4-OCH$_3$ | —CH$_3$ | —CH$_3$ | 404 | 556 | violet |
| 7 | 2-OCH$_3$ | —H | 4-OCH$_3$ | —CH$_3$ | —CH$_3$ | 412 | 578 | blue-grey |

Table I-continued

| No. | R₁ | R₂ | R₃ | X₁ | X₂ | Absorption maximum λmax. in nm free base | Absorption maximum λmax. in nm protonated | Colour of protonated dye* |
|---|---|---|---|---|---|---|---|---|
| 8 | 2-OCH₃ | —H | 5-OCH₃ | —CH₃ | —CH₃ | 425 | 560 | grey |
| 9 | —H | 3-Cl | —H | —CH₃ | —CH₃ | 416 | 510 | orange |
| 10 | —H | —H | 4-Cl | —CH₃ | —CH₃ | 415 | 519 | orange |
| 11 | —H | 3-Cl | 4-CH₃ | —CH₃ | —CH₃ | 413 | 510 | orange |
| 12 | 2-CH₃ | —H | 4-Cl | —CH₃ | —CH₃ | 414 | 506 | orange |
| 13 | 2-CH₃ | —H | 5-Cl | —CH₃ | —CH₃ | 418 | 506 | orange |
| 14 | 2-CH₃ | 4-OCH₃ | 5-Cl | —CH₃ | —CH₃ | 420 | 574 | green-grey |
| 15 | 2-OC₆H₅ | —H | 5-Cl | —CH₃ | —CH₃ | 430 | 518 | orange |
| 16 | 2-O—C(2,4-Cl₂C₆H₃) | —H | —H | —CH₃ | —CH₃ | 418 | 518 | orange |
| 17 | 2-COOCH₃ | —H | —H | —CH₃ | —CH₃ | 417 | 518 | cerise red |
| 18 | —H | 3-SO₂—N(piperidine) | 4-CH₃ | —CH₃ | —CH₃ | 420 | 514 | orange |
| 19 | —H | 3-SO₂—N(CH₃)(C₆H₅) | 4-CH₃ | —CH₃ | —CH₃ | 419 | 517/535 | orange |
| 20 | —H | 3-CH₃ | 4-OCH₃ | —CH₃ | —CH₃ | 408 | 542 | brown |
| 21 | —H | —H | 4-N(CH₃)(COCH₃) | —CH₃ | —CH₃ | 418 | 520 | orange |
| 22 | —H | —H | 4-CO—N(CH₃)₂ | —CH₃ | —CH₃ | 421 | 516 | orange |
| 23 | —H | —H | 4-N(H)(COCH₃) | —CH₃ | —CH₂CH₂CN | 405 | 556 | violet |
| 24 | —H | 3-CH₃ | —H | —CH₃ | —CH₂CH₂CN | 356 | 522/538 | red |
| 25 | —H | —H | 4-CH₃ | —CH₃ | —CH₂CH₂CN | 396 | 534 | brown |
| 26 | 2-OCH₃ | —H | —H | —CH₃ | —CH₂CH₂CN | 400 | 542 | brown |
| 27 | 2-OCH₃ | —H | 5-OCH₃ | —CH₃ | —CH₂CH₂CN | 416 | 566 | grey |
| 28 | —H | 3-Cl | —H | —CH₃ | —CH₂CH₂CN | 406 | 513/534 | orange |
| 29 | —H | —H | 4-Cl | —CH₃ | —CH₂CH₂CN | 404 | 523/541 | orange |
| 30 | —H | 3-Cl | 4-CH₃ | —CH₃ | —CH₂CH₂CN | 404 | 523/540 | orange |
| 31 | —H | 3-CH₃ | —H | —C₂H₅ | —CH₂—C₆H₅ | 400 | 524/543 | brown-orange |
| 32 | 2-COOCH₃ | —H | —H | —C₂H₅ | —CH₂—C₆H₅ | 418 | 527/542 | red |
| 33 | 2-CH₃ | 3-Cl | —H | —CH₃ | —CH₃ | 413 | 500 | orange |
| 34 | 2-O—C₆H₅ | —H | 5-t-C₅H₁₁ | —CH₃ | —CH₃ | 416 | 526 | orange |
| 35 | —H | —H | 4-OCH₃ | —CH₃ | —CH₂CH₂CN | 398 | 555 | brown |
| 36 | 2-OCH₃ | 4-OCH₃ | 5-Cl | —CH₃ | —CH₂CH₂CN | 412 | 574 | brown-green |
| 37 | 2-OCH₃ | —H | —5-SO₂—N(C₂H₅)₂ | —CH₃ | —CH₃ | 427 | 522 | violet |

*Colour here refers to protonation in a solution of 95% acetic acid.

Table II

| No. | R₁ | R₂ | R₃ | X₃ | Absorption maximum λmax. in nm free base | Absorption maximum λmax. in nm protonated | Colour of protonated dye |
|---|---|---|---|---|---|---|---|
| 101 | —H | 3-SO₂—N(piperidine) | 4-CH₃ | —C₂H₅ | | | violet |
| 102 | —H | 3-SO₂—N(CH₃)(CH₃) | 4-CH₃ | —C₂H₅ | | | violet |

Table II-continued

| No. | Substituents in formula I | | | | Absorption maximum $\lambda_{max}$ in nm | | Colour of protonated dye |
| --- | --- | --- | --- | --- | --- | --- | --- |
| | $R_1$ | $R_2$ | $R_3$ | $X_3$ | free base | protonated | |
| 103 | 2-$CH_3$ | —H | 4-Cl | —$C_2H_5$ | 466 | 540 | violet |

When the colour former is one of general formula II, defined above, alkyl and alkoxy in the definitions of $Z_1$, $Z_2$, $Z_3$, $A_1$ and $A_2$ usually are lower alkyl or alkoxy, which as a rule do not contain more than 4 carbon atoms, e.g. n-butyl, n-butoxy, n-propyl, isopropyl, ethyl, ethoxy, methyl or hydroxy. Substituents for alkyl in $Z_1$, $Z_2$ or $Z_3$, e.g. are halogen, hydroxy or lower alkoxy.

The term "halogen" may represent iodine, but preferably bromine or chlorine. The term acylamino preferably means a radical of an aliphatic or aromatic sulfonic or particularly carboxylic acid amide whereby the amide nitrogen may be substituted by lower alkyl. Especially preferred are radicals of an alkane carboxylic acid amide, where the amide nitrogen optionally is substituted by methyl, such as a formic acid amide, acetic acid amide or propionic acid amide radical or radicals of a benzene carboxylic acid amide such as benzoic acid amide.

The term aminoacyl as a rule stands for an amine substituted —CO— or —$SO_2$— group. The amine radical thereby may be of a primary or secondary aliphatic or an heterocyclic amine. Preferred triazenes correspond to the formula VII.

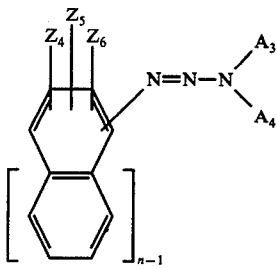

VII in which $Z_4$, $Z_5$ and $Z_6$ each represents hydrogen, alkyl with 1 to 4 carbon atoms, alkoxy with 1 to 4 carbon atoms, halogen, nitro, —N(—$X_1$)—CO—$X_2$ or

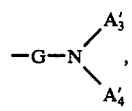

or $COOX_3$, $X_1$ and $X_2$ each representing hydrogen, alkyl with 1 to 4 carbon atoms or phenyl, $X_3$ represents alkyl with 1 to 4 carbon atoms, G is —CO— or —$SO_2$—, $A_3$, $A_4$, $A_3'$ and $A_4'$ each represent alkyl with 1 to 4 carbon atoms or phenyl or $A_3$ and $A_4$, $A_3'$ and $A_4'$ respectively together with the nitrogen atom to which they are bound form a heterocyclic ring system with one or two rings, each ring containing 5 to 7 ring members and n is 1 or 2.

Of special interest are triazenes of the formula VIII:

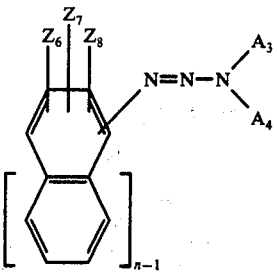

VIII in which $Z_7$ and $Z_8$ each represent hydrogen, alkyl with 1 to 4 carbon atoms, alkoxy with 1 to 4 carbon atoms or halogen, and $Z_6$, $A_3$, $A_4$ and n have the meaning given above.

Advantageous results are obtained with colour formers of the formula IX:

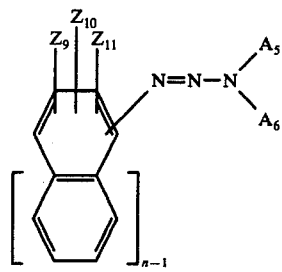

(IX)

in which $Z_9$ represents hydrogen, alkyl with 1 or 2 carbon atoms, alkoxy with 1 or 2 carbon atoms, halogen, nitro, -N(-$X_4$)- CO-$X_5$,

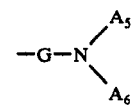

or —$COOX_6$, $X_4$ represents hydrogen, alkyl with 1 or 2 carbon atoms or phenyl, $X_5$ represents alkyl with 1 or 2 carbon atoms, $X_6$ represents alkyl with 1 or 2 carbon atoms or phenyl, $Z_{10}$ and $Z_{11}$ each represent hydrogen, alkyl with 1 or 2 carbon atoms, alkoxy with 1 or 2 carbon atoms or halogen, G represents —CO— or —$SO_2$—; $A_5$, $A_6$, $A_5'$ and $A_6'$ each represent alkyl with 1 or 2 carbon atoms or phenyl or $A_5$ and $A_6$ and $A_5'$ and $A_6'$ respectively together with the nitrogen atoms to which they are bound form a heterocyclic ring system with one or two rings consisting of carbon, nitrogen and at most one oxygen as ring members, each ring containing 5 to 7 ring members and the ring system containing at most 10 ring members.

Very suitable colour formers are triazenes of the formula X:

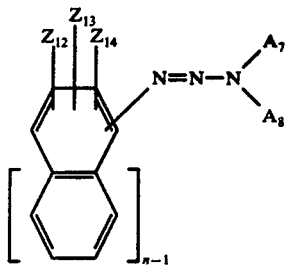

in which $Z_{12}$ represents hydrogen, methyl, methoxy, chlorine, nitro,

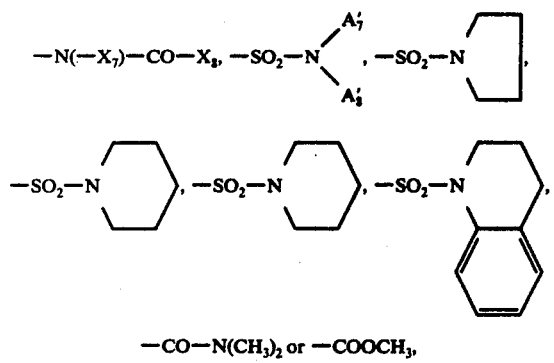

$Z_{13}$ is hydrogen, methyl, methoxy or chlorine
$Z_{14}$ is hydrogen or methoxy $A_7'$ is methyl, ethyl or phenyl
$A_8'$ is methyl, ethyl or hydrogen
$A_7$ is methyl, ethyl or phenyl
$A_8$ is methyl or ethyl or $A_7$ and $A_8$ together with the nitrogen atom to which they are bound represent

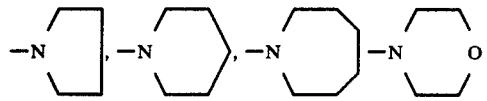

$X_7$ is hydrogen or methyl, $X_8$ is methyl or phenyl and $n$ is 1 or 2.

These colour formers as such either are well known or may be prepared by conventional methods known in the art. A general method e.g. can be described thus:

The primary aromatic amine is dissolved in hydrochloric acid and water, then the solution is cooled to 0° C with ice. Sodium nitrite is added beneath the surface at such a rate that a slight excess of nitrous acid is always present. When the diazotisation is complete the reaction mixture is added to a solution or suspension of the secondary amine and sodium hydrogen carbonate in water at 10° C. The reaction mixture is stirred and allowed to reach room temperature. Stirring is continued until no diazonium compound can be detected. The product is out of solution and is filtered off or extracted into an organic solvent, washed with water and dried in vacuo at temperature below 50° C.

These colour formers as such are colourless and can form coloured images when brought into contact with a typical azoic coupling substance and the organic acid.

Suitable colour formers of the formula II, e.g. are:

Table III

| | symbols in formula (II) | | | | | | |
|---|---|---|---|---|---|---|---|
| No. | $Z_1$ | $Z_2$ | $Z_3$ | n | position —N=N.... | $A_1$ | $A_2$ |
| 6.1 | 3-$SO_2N(CH_3)_2$ | 4-$CH_3$ | H | I | I | —$CH_3$ | —$CH_3$ |
| 6.2 | | | | | | —$C_2H_5$ | —$C_2H_5$ |
| 6.3 | | | | | | |  |
| 6.4 | | | | | | |  |
| 6.5 | | | | | | |  |
| 6.6 | | | | | | | 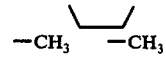 |
| 6.7 | 3-$SO_2N(C_2H_5)_2$ | | | | | —$CH_3$ | —$CH_3$ |
| 6.8 | | | | | | |  |
| 6.9 | | | | | | | |
| 6.10 | | | | | | | 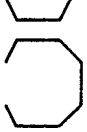 |

Table III-continued

| | symbols in formula (II) | | | | | | |
|---|---|---|---|---|---|---|---|
| No. | $Z_1$ | $Z_2$ | $Z_3$ | n | position $-N=N-$ | $A_1$ | $A_2$ |
| 6.11 | 3-SO$_2$-N(pentamethylene) | | | | | -CH$_3$ | -CH$_3$ |
| 6.12 | | | | | | -(CH$_2$)$_4$- | |
| 6.13 | | | | | | -(CH$_2$)$_5$- | |
| 6.14 | | | | | | -(CH$_2$)$_6$- | |
| 6.15 | | | | | | -(CH$_2$)$_2$-O-(CH$_2$)$_2$- | |
| 6.16 | 3-SO$_2$-N(piperidino) | | | | | -CH$_3$ | -CH$_3$ |
| 6.17 | | | | | | -(CH$_2$)$_4$- | |
| 6.18 | | | | | | -(CH$_2$)$_5$- | |
| 6.19 | | | | | | -(CH$_2$)$_6$- | |
| 6.20 | | | | | | -(CH$_2$)$_2$-O-(CH$_2$)$_2$- | |
| 6.21 | 3-SO$_2$-N(hexamethyleneimino) | 4-CH$_3$ | H | I | I | -CH$_3$ | -CH$_3$ |
| 6.22 | | | | | | -(CH$_2$)$_4$- | |
| 6.23 | | | | | | -(CH$_2$)$_5$- | |
| 6.24 | | | | | | -(CH$_2$)$_6$- | |
| 6.25 | | | | | | -(CH$_2$)$_2$-O-(CH$_2$)$_2$- | |
| 6.26 | 3-SO$_2$-NH-C$_6$H$_5$ | | | | | -(CH$_2$)$_5$- | |

Table III-continued

| No. | $Z_1$ | $Z_2$ | $Z_3$ | a | position $-N=N-$ | $A_1$ | $A_2$ |
|---|---|---|---|---|---|---|---|
| 6.27 | 3-SO$_2$-N(CH$_3$)(C$_6$H$_5$) | | | | | -CH$_3$ | -CH$_3$ |
| 6.28 | | | | | | | |
| 6.29 | | | | | | | |
| 6.30 | | | | | | | |
| 6.31 | | | | | | | |
| 6.32 | 3-SO$_2$-N(C$_2$H$_5$)(C$_6$H$_5$) | | | | | | |
| 6.33 | 3-SO$_2$-N(tetrahydroquinoline) | | | | | -CH$_3$ | -CH$_3$ |
| 6.34 | | | | | | -C$_2$H$_5$ | -C$_2$H$_5$ |
| 6.35 | | | | | | | |
| 6.36 | | | | | | | |
| 6.37 | | | | | | | |
| 6.38 | 4-N(CO-CH$_3$)(CH$_3$) | H | | | | | |
| 6.39 | 4-NH-CO-C$_6$H$_5$ | 2-OCH$_3$ | 5-OCH$_3$ | | | | |
| 6.40 | 4-CO-N(CH$_3$)(CH$_3$) | H | H | | | | |
| 6.41 | 2-COOCH$_3$ | | | | | | |
| 6.42 | 4-NO$_2$ | H | H | I | I | | |
| 6.43 | 4-Cl | 2-CH$_3$ | | | | | |
| 6.44 | 5-OCH$_3$ | 2-OCH$_3$ | | | | | |
| 6.45 | 4-OCH$_3$ | | | | | | |
| 6.46 | | | 5-Cl | | | | |
| 6.47 | 4-SO$_2$N(C$_2$H$_5$) | H | H | | | | |
| 6.48 | 4-SO$_2$-N(piperidine) | | | | | | |

Table III-continued

| No. | $Z_1$ | $Z_2$ | $Z_3$ | n | position —N=N.... | $A_1$ | $A_2$ |
|---|---|---|---|---|---|---|---|
| 6.49 | 2-SO$_2$N(C$_2$H$_5$)(C$_6$H$_5$) | | | | | | |
| 6.50 | 3-SO$_2$—N(piperidino) | | | | | | |
| 6.51 | 5-SO$_2$N(C$_2$H$_5$)$_2$ | 2-OCH$_3$ | | | | | |
| 6.52 | | | | | | (cyclohexyl) | |
| 6.53 | 4-Cl | 2-CH$_3$ | | | | —CH$_3$ | —C$_6$H$_5$ |
| 6.54 | 4-OCH$_3$ | 2-OCH$_3$ | | | | | |
| 6.55 | 5-OCH$_3$ | | | | | | |
| 6.56 | 5-Cl | 2-Cl | | | | | |
| 6.57 | | 2-CH$_3$ | | | | | |
| 6.58 | 4-SO$_2$N(C$_2$H$_5$)$_2$ | H | | | | —CH$_3$ | —CH$_3$ |
| 6.59 | 4-SO$_2$—N(piperidino) | | | | | | |
| 6.60 | 5-SO$_2$—N(C$_2$H$_5$)$_2$ | | | | | —C$_2$H$_5$ | —C$_2$H$_5$ |
| 6.61 | —H | | | 2 | | | (cyclohexyl) |
| 6.62 | 5-SO$_2$—N(C$_2$H$_5$)$_2$ | | | | | | |
| 6.63 | 4-SO$_2$—N(piperidino) | | | | | | |
| 6.64 | 6-SO$_2$—N(piperidino) | | | | | | |
| 6.65 | 5-SO$_2$—N(C$_2$H$_5$)$_2$ | | | | | | |
| 6.66 | 5-SO$_2$—N(C$_2$H$_5$)$_2$ | | | | | —CH$_3$ | —CH$_3$ |

When a triazene compound of formula II is used as colour former for azo coupling component preferably is a naphthalene, benzene, pyrazolone or quinoline or more particularly a naphthol or a naphthylamine.

Amont the naphthol those of the formula

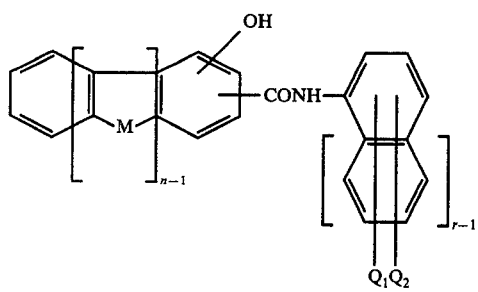

(XI)

are of special interest, in which M is —NH—, —S— or —O—, $Q_1$ and $Q_2$ each represent hydrogen, nitro, halogen, alkyl with 1 to 4 carbon atoms or alkoxy with 1 to 4 carbon atoms, m and r are each 1 or 2.

Naphthylamines which are very valuable correspond to the formula

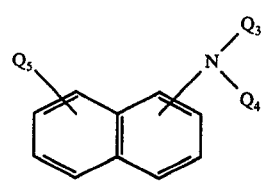

(XII)

in which $Q_3$ and $Q_4$ each represent hydrogen, alkyl with 1 to 4 carbon atoms, benzyl or phenyl or where $Q_3$, $Q_4$ and the nitrogen atom to which they are bound together form a heterocyclic ring system with one or two rings consisting of carbon, nitrogen and at most one oxygen as ring members, each ring containing 5 to 7 ring members and the ring system containing at most 10 ring members and $Q_5$ is hydrogen or a sulfonic acid group.

All the azo couplers suitable for use in the present invention are of the well known couplers used for making azo dyestuffs and they thus are known as such and are prepared by well known methods.

The following naphthols of formula XI e.g. are very suitable as coupling components:

Table IV

| | symbols in formula (XI) | | | | | | |
|---|---|---|---|---|---|---|---|
| No. | position of -OH | position of -CONH- | m | M | r | $Q_1$ | $Q_2$ |
| 8.1 | 2 | 3 | 1 | — | 1 | H | H |
| 8.2 | 2 | 3 | 1 | — | 1 | 4-Cl | H |
| 8.3 | 2 | 3 | 1 | — | 1 | 4-Cl | 2-CH$_3$ |
| 8.4 | 2 | 3 | 1 | — | 1 | H | 2-OCH$_3$ |
| 8.5 | 2 | 3 | 1 | — | 1 | H | 2-CH$_3$ |
| 8.6 | 2 | 3 | 1 | — | 1 | 3-NO$_2$ | H |
| 8.7 | 2 | 3 | 1 | — | 1 | 5-OCH$_3$ | 2-OCH$_3$ |
| 8.8 | 2 | 3 | 1 | — | 1 | 4-OCH$_3$ | H |
| 8.9 | 2 | 3 | 1 | — | 1 | 4-OCH$_3$ | 3-Cl |
| 8.10 | 2 | 3 | 1 | — | 1 | 5-Cl | 2-CH$_3$ |
| 8.11 | 2 | 3 | 1 | — | 1 | 4-CH$_3$ | H |
| 8.12 | 3 | 4 | 2 | NH | 1 | 4-Cl | H |
| 8.13 | 2 | 3 | 2 | 0 | 1 | 5-OCH$_3$ | 2-OCH$_3$ |
| 8.14 | 2 | 3 | 1 | — | 2 | H | H |

Naphthylamines of formula XII e.g. are:

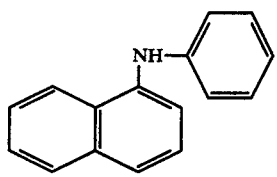

(9.1)

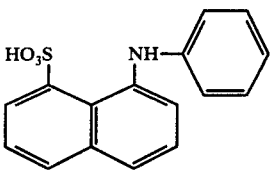

(9.2)

Further suitable azo couplers correspond to these formulae:

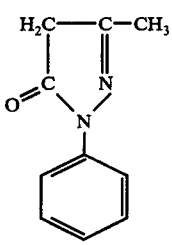

(10.1)

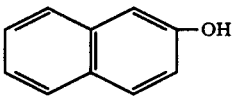

(10.2)

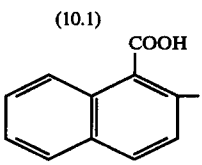

(10.3)

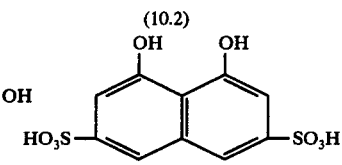

(10.4)

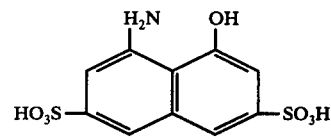

(10.5)

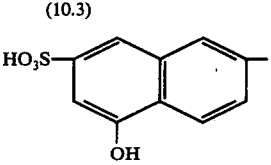

(10.6)

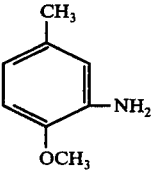

(10.7)

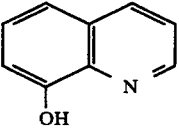

(10.8)

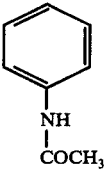

(10.9)

With these colour formers a large variety of colours may be produced ranging from orange to violet. Mixtures of such colour formers are suitable to give neutral shades such as grey. A special advantage of the triazenes is the light fastness of the colours they produced.

The paper treated with a dispersion according to the present invention may be printed using an ink as described and claimed in our copending application No. 18199/74 and, providing the ink used contains a colour former with a different colour change to that already on the paper or produces a different colour change by virtue of the ink containing a differently coloured dye or pigment, two colour changes will be observed when the paper is treated with an acid.

The invention will be illustrated by the following Examples, in which parts and percentages are by weight.

EXAMPLE 1

0.1 Parts of colour former No. 32 in Table 1 having the formula

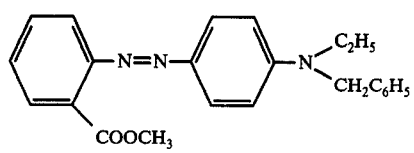

was dissolved in 5 parts of 2-ethoxy ethanol. This solution was then poured into 50 parts of water with agitation to produce dispersion.

This dispersion was added to a beater containing 50 parts of paper pulp dispersed in 2,500 parts of water. 1 part of ketene dimer was then added as sizing agent, and a sheet of paper was then formed in the usual way. The yellow paper changed color to red when citric acid was stamped on from a stamp pad by means of a rubber stamp.

EXAMPLE 2

Example 1 was repeated except that the coloor former solution was added directly to the paper pulp dispersion. Similar results were obtained.

EXAMPLE 3

Example 1 was repeated, except that the water contained 5% of a non-ionic starch and 0.5% of an acrylic latex. The resulting dispersion had improved stability.

When added to paper pulp, as in Example 1, similar results were obtained.

EXAMPLES 4 – 7

Example 2 was repeated using various colour formers. The color formers used and the resulting colour changes are shown in Table 1.

Table 1

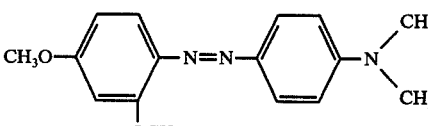

EXAMPLES 9 – 18

A dispersion was made by the process described in Example 1, except that a dye was predissolved in the water. The combination of dyes, colour formers and colour changes produced on paper impregnated with the dispersions are shown in Table 2.

Table 2

| Example | Colour former of Example No. | in % | Dye | | Colour Change | | |
|---|---|---|---|---|---|---|---|
| 9 | 1 | 1% | 0.6% | Direct Yellow 4 | Yellow | → | red |
| 10 | 6 | 1% | 0.3% | Direct Yellow 4 | Yellow | → | red |
| 11 | 4 | 0.5% | 0.5% | Direct Yellow 4 | Yellow | → | black |
|  | 1 | 0.1% |  |  |  |  |  |
| 12 | 5 | 1% | 0.2% | Direct Yellow 4 | Yellow | → | blue |
| 13 | 6 | 0.5% | 0.5% | Direct Blue 199 | Blue | → | red |
| 14 | 4 | 1% | 0.4% | Direct Red 23 | Orange | → | blue |
| 15 | 7 | 1% | 0.5% | Direct Blue 199 | Blue | → | green |
| 16 | 1 | 0.1% | 0.1% | Direct Blue 199 | Green | → | red |
|  |  |  |  | Acid Yellow 5 |  |  |  |
| 17 | 1 | 1% | 0.5% | Direct Blue 199 | Green | → | red |
|  |  |  |  | Acid Yellow 5 |  |  |  |
| 18 | 7 | 1% | 0.5% | Direct Yellow 4 | Yellow | → | green |
| 19 | 6 | 0.5% | 0.5% | Direct Yellow 4 | Yellow | → | black |
|  | 7 | 0.5% |  |  |  |  |  |

Direct Yellow 4 = C.I. 24890
Direct Blue 199 = C.I. 74180
Direct Red 23 = C.I. 29160
Acid Yellow 5 = C.I. 47035

EXAMPLES 20 – 42

An aqueous mixture was formed from 500 parts of a 4% aqueous starch, 2.5 parts of an acrylic latex and 0.033 parts of the sodium salt of a naphthalene sulphonic acid/formaldehyde condensation product. In some cases a dyestuff was also added. To this mixture was added a solution of a colour former in 11.8 parts of 2-ethoxyethanol to form a stable dispersion.

The resulting dispersion was applied to paper by roller coating at 60° C. in an amount of 0.2% by weight of the fibre in the paper.

The colour formers, dyes and resulting colour changes are shown in Table 3.

Table 3

| Example | Colour former of Example No. | in % | | Dye | Colour Change |
|---|---|---|---|---|---|
| 20 | 1 | 0.5% | | — | Yellow → red |
| 21 | 1 | 0.1% | 0.1% | Direct Blue 199 } Acid Yellow 5 | Green → red |
| 22 | 4 | 0.5% | | — | Yellow → blue |
| 23 | 4 | 0.1% | 0.2% | Direct Yellow 4 | Yellow → grey/green |
| 24 | 5 | 0.5% | | — | Colourless → blue |
| 25 | 5 | 0.5% | 0.07% | Direct Red 23 | Pink → blue |
| 26 | 6 | 0.5% | | — | Colourless → red |
| 27 | 6 | 0.5% | 0.5% | Direct Blue 199 | Blue → red |
| 28 | 6 | 0.5% | 0.1% | Direct Blue 199 } Acid Yellow 5 | Green → red |
| 29 | 7 | 0.5% | 0.2% | Direct Red 23 | Red → green |
| 30 | 7 | 0.5% } | | — | Off white → black |
|  | 6 | 0.5% | | | |
| 31 | 5 | 1% | 0.1% | Direct Yellow 4 | Yellow → blue/green |
| 32 | 6 | 1% | 0.2% | Direct Yellow 4 | Yellow → red |
| 33 | 1 | 0.5% | 0.6% | Direct Yellow 4 | Yellow → red |
| 34 | 1 | 0.2% | 0.05% | Direct Blue 76 | Green → red |
| 35 | 4 | 0.5% | 0.2% | Direct Red 23 | Orange → blue |
| 36 | 1 | 0.5% | 0.25% | Direct Blue 199 } Acid Yellow 5 | Green → blue/black |
| 37 | 5 | 1% | 0.2% | Direct Blue 199 } Acid Yellow 5 | Green → blue |
| 38 | 7 | 0.5% | 0.2% | Direct Yellow 4 | Yellow → green |
| 39 | 5 | 0.5% } | 1.5% | Direct Red 23 | Red → black |
|  | 7 | 0.4% | | | |
| 40 | 7 | 0.5% | 0.2% | Direct Blue 199 | Blue → green |
| 41 | 5 | 0.5% } | 0.5% | Direct Yellow 4 | Yellow → black |
|  | 6 | 0.1% | | | |
| 42 | 1 | 0.1% } | 0.5% | Direct Yellow 4 | Yellow → black |
|  | 4 | 0.4% | | | |

We claim:

1. An image producing system which comprises a neutral or alkaline sized paper impregnated or coated in a size press with a dispersion of a colour former in a mixture of water and a water-miscible organic solvent for the colour former in admixture with a polymer acrylic latex; and a carrier material impregnated with a solution of an organic acid in a weakly volatile high boiling solvent, said color former is an azo compound having the formula

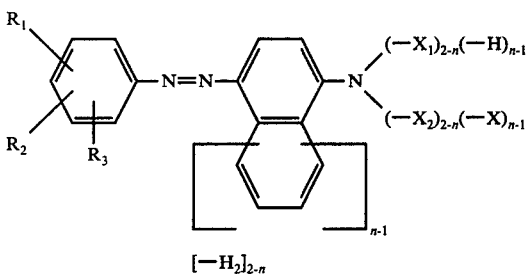

in which $R_1$, $R_2$ and $R_3$ each represents hydrogen, halogen, alkyl, alkoxy, aryloxy, alkoxycarbonyl, dialkylaminocarbonyl, acylamino, acyl(alkyl)amino,

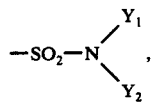

in which $Y_1$ and $Y_2$ each represents alkyl or aryl, or in which $Y_1$ and $Y_2$ together represent an alkylene group; $X_1$ is hydrogen or an alkyl group, $X_2$ is an alkyl, cyanoalkyl or arylmethylene group or $X_1$ and $X_2$ together represent an alkylene group, $X_3$ is an alkyl or aryl group and $n$ is 1 or 2, preferably 1, or the general formula II:

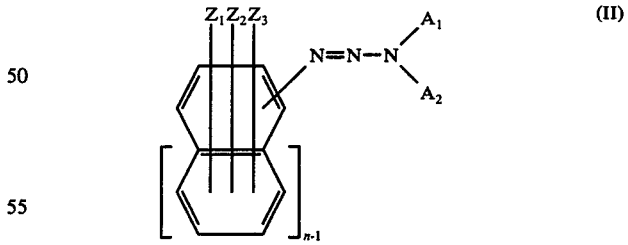

in which $Z_1$, $Z_2$ and $Z_3$ each represents hydrogen, alkyl, substituted alkyl, alkoxy, halogen, nitro, acylamino, aminoacyl or alkoxycarbonyl, $A_1$ and $A_2$ each represents alkyl or phenyl or $A_1$ and $A_2$ together with the nitrogen atom to which they are bound form a heterocyclic ring system and $n$ is 1 or 2.

2. A system as claimed in claim 1, in which the paper impregnation or coating also contains a starch.

3. A system as claimed in claim 1, in which the paper impregnation or coating also contains a dyestuff or pigment.

4. A system as claimed in claim 1, in which the high boiling solvent has a boiling point of at least 150° C.

5. A system as claimed in claim 1, in which the high boiling solvent is partially hydrogenated terphenyl alone or mixed with other solvents, phthaloyl butyl glycolate, ethylene glycol, diethylene glycol, triethylene glycol or polyethylene glycol having a molecular weight from 200 to 600.

6. A system as claimed in claim 1, in which the acid is maleic acid, oxalic acid, malonic acid, succinic acid, glutaric acid, adipic acid, tricarballylic acid, diglycollic acid, lactic acid, malic acid, tartaric acid, citric acid, pyrophosphonic acid, benzene sulphonic acid, naphthalene-2-sulphonic acid, 1-phenol-4-sulphonic acid, polymaleic acid, co- and ter-polymers of maleic acid with ethyl acrylate and vinyl acetate, hydroxyethane diphosphonic acid and methylamino-N-N-di-methylene phosphonic acid.

7. A system as claimed in claim 1, in which the carrier material is a fabric, a paper material, a felt or fabric pad or a felt-tipped pen.

8. A system as claimed in claim 1, in which the carrier material is impregnated with from 5 - 200% of its dry weight of the organic acid solution.

9. A process for treating paper which comprises treating paper pulp in a beater or coating paper with a colour former in admixture with a polymer acrylic latex and in which the paper is neutral or alkaline sized, said colour former is an azo compound having the formula

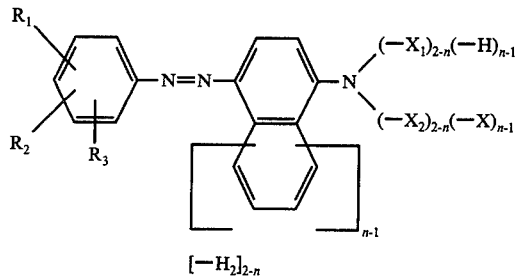

in which $R_1$, $R_2$ and $R_3$ each represents hydrogen, halogen, alkyl, alkoxy, aryloxy, alkoxycarbonyl, dialkylaminocarbonyl, acylamino, acyl(alkyl)amino,

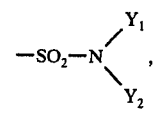

in which $Y_1$ and $Y_2$ each represents alkyl or aryl, or in which $Y_1$ and $Y_2$ together represent an alkylene group; $X_1$ is hydrogen or an alkyl group, $X_2$ is an alkyl, cyanoalkyl or arylmethylene group or $X_1$ and $X_2$ together represent an alkylene group, $X_3$ is an alkyl or aryl group and $n$ is 1 or 2, preferably 1, or the general formula II:

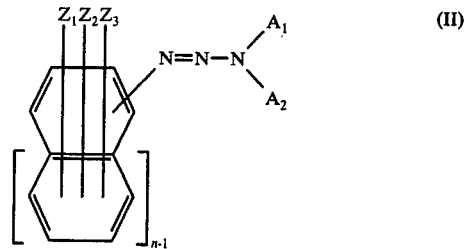

in which $Z_1$, $Z_2$ and $Z_3$ each represents hydrogen, alkyl, substituted alkyl, alkoxy, halogen, nitro, acylamino, aminoacyl or alkoxycarbonyl, $A_1$ and $A_2$ each represents alkyl or phenyl or $A_1$ and $A_2$ together with the nitrogen atom to which they are bound form a heterocyclic ring system and $n$ is 1 or 2.

10. Paper whenever treated by a process as claimed in claim 9.

11. A method of producing an image which comprises a neutral or alkaline sized paper impregnated or coated with a color former and a polymer acrylic latex, a carrier material impregnated with a solution of an organic acid in a weakly volatile high boiling solvent and transferring the organic acid on to the impregnated or coated paper.

* * * * *